United States Patent [19]

Hirsch

[11] Patent Number: 4,565,723
[45] Date of Patent: Jan. 21, 1986

[54] COMPOSITE POLYMERIC PANEL AND PROCESS FOR MAKING SAME

[75] Inventor: Elisabeth Hirsch, Wiener Neustadt, Austria

[73] Assignee: General Electric Plastics Structured Products Europe B.V., AC Bergen op Zoom, Netherlands

[21] Appl. No.: 550,922

[22] Filed: Nov. 10, 1983

[30] Foreign Application Priority Data

Nov. 10, 1982 [AT] Austria .................................. 4092/82

[51] Int. Cl.$^4$ ............................ B32B 3/00; B29D 7/00
[52] U.S. Cl. ...................................... 428/71; 264/45.9; 264/46.1; 428/72; 428/119; 428/166; 428/178; 428/188
[58] Field of Search ................ 264/45.9, 46.1; 428/71, 428/72, 73, 119, 166, 167, 178, 188, 318.4, 318.6, 319.3, 319.7, 319.9

[56] References Cited

U.S. PATENT DOCUMENTS

| | | | |
|---|---|---|---|
| 3,987,134 | 10/1976 | Shiina et al. | 428/72 |
| 4,150,186 | 4/1979 | Kazama | 428/178 |
| 4,305,982 | 12/1981 | Hirsch | 428/119 |
| 4,356,642 | 11/1982 | Herman | 428/178 |
| 4,463,043 | 7/1984 | Reeves et al. | 428/119 |

FOREIGN PATENT DOCUMENTS

| | | |
|---|---|---|
| 329828 | 5/1976 | Austria . |
| 360721 | 1/1981 | Austria . |
| 1609777 | 4/1970 | Fed. Rep. of Germany . |
| 2054434 | 7/1972 | Fed. Rep. of Germany . |
| 2706598 | 8/1978 | Fed. Rep. of Germany . |
| 2802179 | 7/1979 | Fed. Rep. of Germany . |
| 2909725 | 9/1980 | Fed. Rep. of Germany ...... 428/178 |
| 539750 | 9/1973 | Switzerland . |
| 1042732 | 9/1966 | United Kingdom . |
| 1174287 | 12/1969 | United Kingdom . |
| 2041292 | 9/1980 | United Kingdom . |

OTHER PUBLICATIONS

European Search Report with Annex (no date).
European Application No. 0,006,431 (no date).

Primary Examiner—William J. Van Balen
Attorney, Agent, or Firm—Karl F. Ross; Herbert Dubno

[57] ABSTRACT

A skeletal layer of a first polymeric material, consisting of two parallel plates interconnected by spaced-apart webs, is overlain on at least one plate surface by a reinforcing layer of a more wear-resistant or otherwise protective second polymeric material, possibly with interposition of an equalizing layer of a third polymeric material. The reinforcing layer may carry a lower-melting coating of a fourth polymeric material serving to hold a covering such as a textile fabric in position thereon. The voids of the skeletal layer may be filled with foam plastic. The composite panel can be formed by joint extrusion of all polymeric layers and can be subjected to subsequent deformation under heat and pressure into a shaped body.

24 Claims, 2 Drawing Figures

FROM EXTRUDER

HEAT AND PRESSURE

COMPOSITE POLYMERIC PANEL AND PROCESS FOR MAKING SAME

FIELD OF THE INVENTION

My present invention relates to a composite panel made from various polymeric materials and to a process for producing such a panel.

BACKGROUND OF THE INVENTION

In my prior U.S. Pat. No. 4,305,982 I have described a shatterproof laminate adapted to serve as an insulator of light-transmissive character usable, for example, in a skylight or in a greenhouse. The laminate comprises a synthetic-resin panel of skeletal type, with two parallel plates interconnected by spaced-apart webs, bonded onto a glass sheet. Suitable polymeric materials mentioned in the patent include polymethylmethacrylate, polyvinylchloride and polyethylene, which are thermoplastic resins, as well as polycarbonates which could be of either thermoplastic or thermosetting character. A structurally improved skeletal panel is the subject matter of my copending application Ser. No. 541,672 filed Oct. 13, 1983.

Panels or layers of such a skeletal structure are generally produced by extrusion. In some instances several such layers are extruded jointly to form a composite panel.

OBJECTS OF THE INVENTION

An important object of my present invention is to provide an insulating panel of the general type referred to which can be used for a variety of purposes without necessarily being bonded to an inorganic support such as a glass plate.

A more particular object is to provide a composite polymeric panel of this nature capable of being deformed into a nonplanar shape which it subsequently retains.

Another object is to provide a transparent or translucent panel of this type with a wear-resistant surface in order to prevent a diminution of its light transmissivity by scratches due to hailstones or other falling objects.

A further object is to provide a process for making such composite panels.

SUMMARY OF THE INVENTION

A composite panel according to my present invention comprises, essentially, a basic skeletal layer of the aforedescribed type, consisting of a first polymeric material, and a reinforcing layer of a protective second polymeric material overlying at least one of the plates of the skeletal layer.

When the composite panel is to be transparent or translucent, e.g. for use as a roof of a greenhouse, the skeletal layer may consist of a polycarbonate while the reinforcing layer is made of a polyacrylate such as the polymethylmethacrylate mentioned in my prior patent. In that case it will be advantageous to interpose an intermediate layer of a third polymeric material between the skeletal layer and the reinforcing layer to equalize level differences; the third polymeric material could be polyethylene, for example.

In other instances, in which scratch resistance is less of a consideration, the resinous material of the skeletal layer may be softer than the protective material of the reinforcing layer which in that case advantageously consists of a polycarbonate. Thus, the first polymer may then be a thermoplastic resin such as polystyrene, low-pressure polyethylene, an acrylonitrile-butadiene-styrene copolymer (ABS) or polypropylene. The scratch-prone polycarbonate layer is advantageously provided with a covering such as a textile fabric which can be bonded thereto with the aid of an adhesive layer of a further polymeric material whose melting point is significantly lower than those of the other polymeric materials. Such a heat-softenable material may be an ethylene-vinylacetate copolymer (EVA), for example.

In all these instances the presence of a layer of polycarbonate confers a high degree of structural stability to the composite panel. The combination of a basic polycarbonate layer with a protective polyacrylate layer is particularly useful in greenhouses or the like since the polyacrylate is not only scratchproof but also stable against ultraviolet radiation and thereby minimizes discoloration and aging phenomena in the polycarbonate structure.

The several layers of my improved composite panel are advantageously formed by concurrent extrusion, followed by a slicing of the resulting laminate into sections of the desired dimensions. Such a section, pursuant to a further feature of my invention, can be deformed under heat and pressure to produce a shaped body such as, for example, a domed roof. When light transmissivity is not required, as where the ultimate article is to be covered with a textile fabric or the like, the same technique can be used to shape the laminate into a part of a piece of furniture, for example, such as a seat or a back of a chair or the like. With or without such subsequent deformation, the voids existing between the webs and the plates of a skeletal layer of a non-light-transmissive laminate are advantageously filled with a highly porous polymer, preferably a foam plastic such as polystyrene or polyurethane foam; thus, a foaming agent introduced along with a polymeric substance into these voids during extrusion will expand in that substance on exiting from the extrusion nozzle.

BRIEF DESCRIPTION OF THE DRAWING

The above and other features of my invention will now be described in detail with reference to the accompanying drawing in which.

SPECIFIC DESCRIPTION

Figures 1, 2:
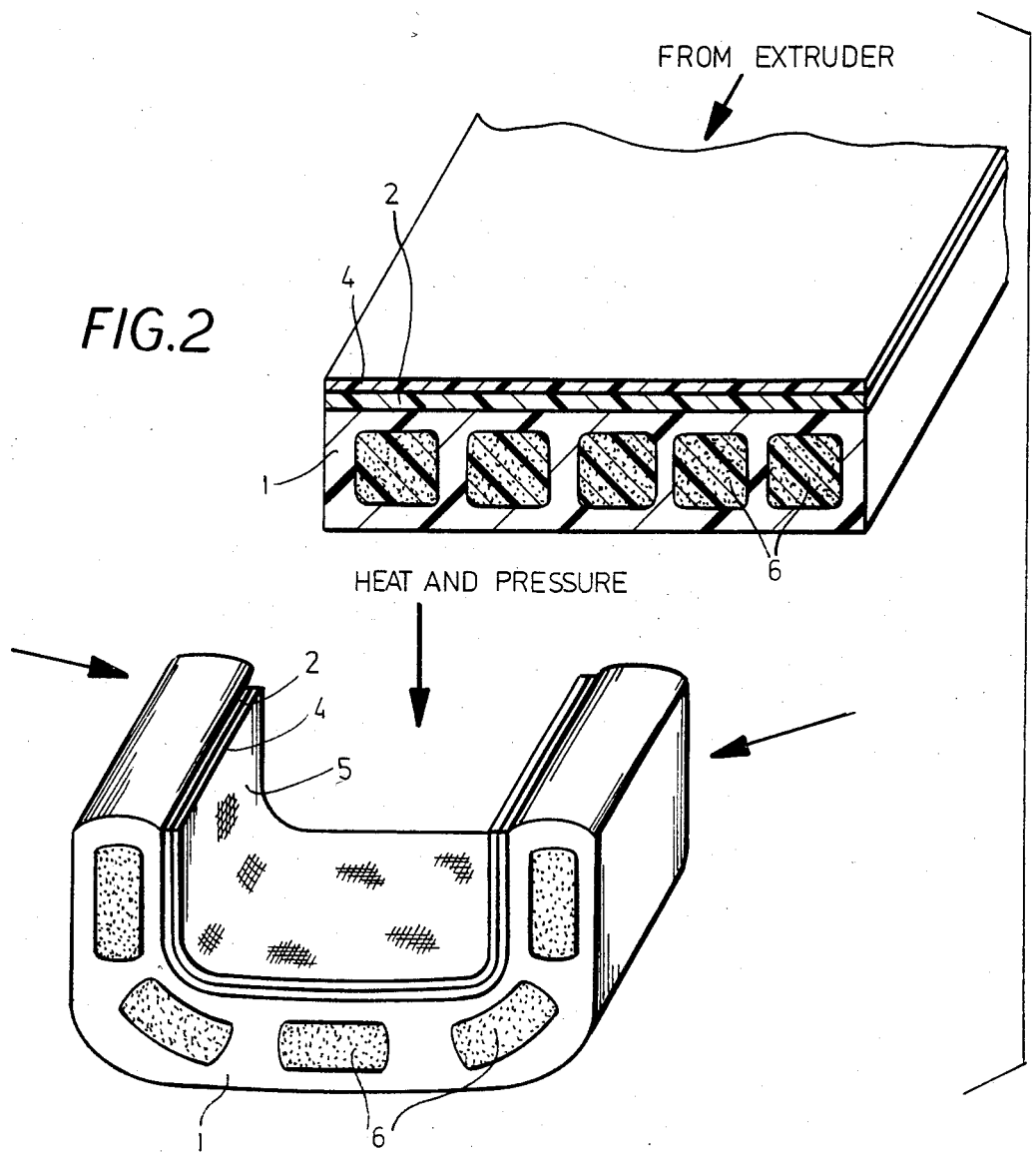
FIG. 1 is a cross-sectional view of part of a composite panel embodying the present invention.
FIG. 2 is a perspective view of part of a similar panel in the process of extrusion and subsequent deformation.

FIG. 1 shows a representative portion of a composite panel according to my invention comprising a basic skeletal layer 1, preferably of a polycarbonate, with a lower plate 1a, an upper plate 1b and spaced-apart webs 1c forming intervening voids 1d. A reinforcing layer 2 of polymethylmethacrylate overlies the upper plate 1b with interposition of an equalizing layer 3. The light-transmissive panel of FIG. 1 can be produced by joint extrusion of the several layers and can be subsequently deformed, with the aid of a heated die, to serve for example as a domed roof of a greenhouse. It should be understood, however, that this panel can also be laminated onto an underlying glass plate in the manner disclosed in my prior U.S. Pat. No. 4,305,982 or my copending application Ser. No. 541,672.

In FIG. 2 I have illustrated a generally similar panel with a basic skeletal layer 1, a reinforcing layer 2 and an adhesive layer 4 all coming from an extruder (not shown) in which these layers are jointly produced and laminated together. The same extruder introduces a foaming agent 6 into the voids 1d (FIG. 1) of the skeletal layer 1 along with polymeric material which may or may not be the same as the resin forming the plates and the webs of that layer. Thus, for example, layers 1, 2 and 4 may respectively consist of polystyrene, polycarbonate and EVA, with the voids of layer 1 occupied by foamed polystyrene.

The laminate exiting from the extruder is cut into sections of predetermined dimensions which, as further shown in FIG. 2, are then deformed under heat and pressure to produce a shaped article such as, for example, the back of an easychair. The adhesive layer 4, softened by the applied heat, can be used to bond a textile fabric 5 to the reinforcing layer 2 under the pressure of the heated die in which the article is being shaped.

Reinforcing layer 2 along with equalizing and/or adhesive layers 3, 4 could also be provided on the lower plate 1a of the skeletal layer 1 shown in FIGS. 1 and 2. The webs 1c need not be perpendicular to the plates 1a, 1b and, furthermore, could be curved instead of straight.

I claim:

1. A composite panel comprising:
a basic skeletal layer of a light-transmissive first polymeric material, said first polymeric material being a polycarbonate, and said skeletal layer consisting of two parallel plates interconnected by spaced-apart webs leaving voids therebetween; and
a reinforcing layer of a light-transmissive protective second polymeric material, said second polymeric material being a polyacrylate, and said reinforcing layer overlying at least one of said plates of said skeletal layer.

2. A panel as defined in claim 1, further comprising an equalizing layer of a light-transmissive third polymeric material interposed between said skeletal layer and said reinforcing layer.

3. A panel as defined in claim 2 wherein said third polymeric material is polyethylene.

4. A panel as defined in claim 1 wherein said voids are filled with a highly porous polymer.

5. A panel as defined in claim 4 wherein said highly porous polymer is a foam plastic.

6. A composite panel comprising:
a basic skeletal layer of a first polymeric material, said skeletal layer consisting of two parallel plates interconnected by spaced-apart webs leaving voids therebetween; and
a reinforcing layer of a protective second polymeric material, said reinforcing layer overlying at least one of said plates of said skeletal layer;
said second polymeric material being of greater hardness than said first polymeric material.

7. A panel as defined in claim 6 wherein said second polymeric material is a polycarbonate.

8. A panel as defined in claim 6 wherein said reinforcing layer is coated with an adhesive layer of a further polymeric material having a lower melting point than said first and second polymeric materials.

9. A panel as defined in claim 8, further comprising a textile covering bonded by said adhesive layer to said reinforcing layer.

10. A panel as defined in claim 8 wherein said further polymeric material is an ethylene-vinylacetate copolymer.

11. A panel as defined in claim 9 wherein said layers are curved.

12. A panel as defined in claim 6 wherein said voids are filled with a highly porous polymer.

13. A panel as defined in claim 12 wherein said highly porous polymer is a foam plastic.

14. A process for making a composite panel, comprising tthe steps of jointly extruding first and second light-transmissive polymeric materials, of which the former is a polycarbonate and the latter is a polyacrylate, into the forms of (a) a basic skeletal layer of said first polymeric material and having two parallel plates interconnected by spaced-apart webs leaving voids therebetween, and (b) at least one protective reinforcing layer of said second polymeric material and overlying a respective one of said plates of said skeletal layer, allowing each said reinforcing layer to bond to the respective one of said plates of said skeletal layer, and cutting the resulting laminate into sections.

15. A process as defined in claim 14 wherein said voids formed between said webs and said plates are filled during the extrusion with a polymeric substance accompanied by a foaming agent and expanding upon extrusion.

16. A process as defined in claim 14 wherein said sections are deformed under heat and pressure into shaped articles.

17. A process as defined in claim 14 wherein a third light-transmissive polymeric material is jointly extruded with said first and second polymeric materials into the form of an equalizing layer interposed between said skeletal layer and said reinforcing layer.

18. A process as defined in claim 17 wherein said third polymeric material is polyethylene.

19. A process for making a composite panel, comprising the steps of jointly extruding first and second polymeric materials, of which the latter has a greater hardness than the former when they are fully solidified, into the forms of (a) a basic skeletal layer of said first polymeric material and having two parallel plates interconnected by spaced-apart webs leaving voids therebetween, and (b) at least one protective reinforcing layer of said second polymeric material and overlying a respective one of said plates of said skeletal layer, allowing each said reinforcing layer to bond to the respective one of said plates of said skeletal layer, and cutting the resulting laminate into sections.

20. A process as defined in claim 19 wherein said voids formed between said webs and said plates are filled during the extrusion with a polymeric substance accompanied by a foaming agent and expanding upon extrusion.

21. A process as defined in claim 19 wherein said sections are deformed under heat and pressure into shaped articles.

22. A process as defined in claim 19 wherein said reinforcing layer is coated with a relatively low-melting polymeric material during extrusion, and a textile fabric layer is bonded to each of said sections with the aid of said low-melting polymeric material.

23. A process as defined in claim 22 wherein said second polymeric material is a polycarbonate.

24. A process as defined in claim 23 wherein said low-melting polymeric material is an ethylene-vinylacetate copolymer.

* * * * *

UNITED STATES PATENT AND TRADEMARK OFFICE
Certificate

Patent No. 4,565,723                                          Patented January 21, 1986

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Kurt Hirsch and Helmut Gander.

Signed and Sealed this Twenty-seventh Day of May, 1986.

BRADLEY R. GARRIS,
*Office of the Deputy Assistant Commissioner for Patents.*